United States Patent
Torii et al.

(10) Patent No.: US 12,359,717 B2
(45) Date of Patent: Jul. 15, 2025

(54) VEHICLE DRIVE DEVICE

(71) Applicant: AISIN CORPORATION, Aichi (JP)

(72) Inventors: Takeshi Torii, Kariya (JP); Shoichi Yamasaki, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/290,239

(22) PCT Filed: Jul. 13, 2022

(86) PCT No.: PCT/JP2022/027532
§ 371 (c)(1),
(2) Date: Nov. 10, 2023

(87) PCT Pub. No.: WO2023/008195
PCT Pub. Date: Feb. 2, 2023

(65) Prior Publication Data
US 2024/0229923 A1    Jul. 11, 2024

(30) Foreign Application Priority Data

Jul. 26, 2021    (JP) .................................. 2021-121585

(51) Int. Cl.
*F16H 57/04* (2010.01)
*B60K 1/00* (2006.01)
*F16H 57/037* (2012.01)

(52) U.S. Cl.
CPC ........... *F16H 57/0436* (2013.01); *B60K 1/00* (2013.01); *F16H 57/037* (2013.01);
(Continued)

(58) Field of Classification Search
CPC ............... F16H 57/037; F16H 57/0423; F16H 57/0424; F16H 57/0428; F16H 57/0436; F16H 57/0483; B60K 1/00
See application file for complete search history.

(56) References Cited

U.S. PATENT DOCUMENTS

2016/0053883 A1 *  2/2016  Ichikawa ............ F16H 57/0428
                                                                74/467
2017/0057349 A1 *  3/2017  Ogawa .................. F16H 57/037

FOREIGN PATENT DOCUMENTS

CN          202118480 U  *  1/2012
CN          103133672 A  *  6/2013
(Continued)

OTHER PUBLICATIONS

International Search Report for PCT/JP2022/027532 dated Sep. 20, 2022.

*Primary Examiner* — William C Joyce
(74) *Attorney, Agent, or Firm* — Sughrue Mion, PLLC

(57) ABSTRACT

A blade portion that rotates integrally with a target shaft portion is provided between a target outer peripheral surface that is an outer peripheral surface of the target shaft portion and a tubular inner peripheral surface of a case. A first opening that communicates with a first oil passage is located away, on a first axial side, from a second opening that communicates with a second oil passage. The first oil passage communicates with an oil reservoir. The second oil passage communicates with a target space to which oil is supplied. Assuming that a forward rotation state is a rotation state of each part when a wheel is rotating in a direction in which a vehicle moves forward, the blade portion force-feeds the oil to a second axial side when the target shaft portion is in the forward rotation state.

4 Claims, 4 Drawing Sheets

(52) U.S. Cl.
CPC ..... *F16H 57/0423* (2013.01); *F16H 57/0424* (2013.01); *F16H 57/0428* (2013.01); *F16H 57/0483* (2013.01); *B60K 2001/001* (2013.01)

(56) References Cited

FOREIGN PATENT DOCUMENTS

| | | | |
|---|---|---|---|
| JP | 2003042273 A * | 2/2003 | ......... F16H 57/0427 |
| WO | WO-2020032168 A1 * | 2/2020 | |
| WO | 2020/203916 A1 | 10/2020 | |

* cited by examiner

VEHICLE DRIVE DEVICE

CROSS REFERENCE TO RELATED APPLICATIONS

This application is a National Stage of International Application No. PCT/JP2022/027532 filed Jul. 13, 2022, claiming priority based on Japanese Patent Application No. 2021-121585 filed Jul. 26, 2021 the entire contents of which are incorporated in their entirety.

TECHNICAL FIELD

The present disclosure relates to a vehicle drive device including a drive source that drives wheels, a transmission mechanism that transmits power between the drive source and the wheels, and a case that houses the drive source and the transmission mechanism.

BACKGROUND ART

WO2020/203916 discloses a vehicle drive device (100) including a mechanical pump (7) inside a case that houses a transmission mechanism that transmits power between wheels and a drive source for the wheels (reference numerals in parentheses in the background art are those in the reference document). The pump (7) includes a pump input gear (71) to which a driving force for the pump (7) is input. The pump input gear (71) meshes with a pump drive gear (57) provided so as to rotate integrally with a differential input gear (51) of a differential gear mechanism (5) in the transmission mechanism.

RELATED ART DOCUMENTS

Patent Documents

Patent Document 1: WO2020/203916

SUMMARY OF THE DISCLOSURE

Problem to be Solved by the Disclosure

The vehicle drive device includes a gear pair that is the pump drive gear and the pump input gear to drive the pump. That is, the pump drive gear pair is provided to drive the pump in addition to the gears for driving the wheels. This gear pair may hinder downsizing and cost reduction of the vehicle drive device.

Therefore, there is a demand to provide a technology for providing a pump function inside the case that houses the transmission mechanism that transmits power between the wheels and the drive source for the wheels while saving a space.

Means for Solving the Problem

In view of the above, a vehicle drive device includes a drive source configured to drive a wheel, a transmission mechanism configured to transmit power between the drive source and the wheel, and a case that houses the drive source and the transmission mechanism, in which assuming that a target shaft portion is a part of any one shaft of the transmission mechanism, an axial direction is a direction along a rotation axis of the target shaft portion, a first axial side is one side in the axial direction, and a second axial side is the other side in the axial direction, the case has a tubular inner peripheral surface that is an inner peripheral surface that faces a target outer peripheral surface that is an outer peripheral surface of the target shaft portion, a first opening and a second opening that are open in the tubular inner peripheral surface, a first oil passage that communicates with the first opening, and a second oil passage that communicates with the second opening, a blade portion configured to rotate integrally with the target shaft portion is provided between the target outer peripheral surface and the tubular inner peripheral surface, regulating portions configured to regulate a flow of oil in the axial direction between the target outer peripheral surface and the tubular inner peripheral surface are provided on the first axial side and the second axial side with respect to a region in the axial direction where the blade portion, the first opening, and the second opening are located, the first opening is located away from the second opening on the first axial side, the first oil passage communicates with an oil reservoir in which the oil is stored, the second oil passage communicates with a target space that is a space where a supply target to which the oil is supplied is disposed, and assuming that a forward rotation state is a rotation state of each part when the wheel is rotating in a direction in which a vehicle moves forward, the blade portion is configured to force-feed the oil to the second axial side when the target shaft portion is in the forward rotation state.

According to this configuration, the space between the target outer peripheral surface of the target shaft portion and the tubular inner peripheral surface of the case is defined as an oil chamber of a pump, and the target shaft portion and the blade portion are defined as a pump rotor. Therefore, the oil can be supplied to the target space by sucking the oil from the oil reservoir with the rotation of the shaft of the transmission mechanism. That is, the pump function can be provided inside the case without providing a separate oil pump or a gear pair for driving the oil pump. Therefore, the number of components and the size of the vehicle drive device can be reduced. In other words, according to this configuration, the pump function can be provided inside the case that houses the transmission mechanism that transmits power between the wheel and the drive source for the wheel while saving a space.

Further features and advantages of the vehicle drive device will become apparent from the following description of an exemplary and non-limiting embodiment that will be given with reference to the drawings.

MODES FOR CARRYING OUT THE VARIOUS ASPECTS OF THE DISCLOSURE

Hereinafter, an embodiment of a vehicle drive device will be described with reference to the drawings. The direction of each member in the following description represents a direction in a state in which a vehicle drive device 100 is mounted on a vehicle (vehicle-mounted state). Terms related to the dimension, the disposition direction, the disposition position, and the like of each member represent concepts that include a state in which there is a difference due to a variation (variation to an extent permissible in manufacturing). In the vehicle-mounted state, a direction along rotation axes of the vehicle drive device 100 (in the present embodiment, a first axis A1, a second axis A2, and a third axis A3 that are different axes parallel to each other; details will be described later) will be referred to as "axial direction L". One side in the axial direction L will be referred to as "first axial side L1" and the other side in the axial direction L will be referred to as "second axial side L2". A direction orthogonal to each of the first axis A1, the second axis A2, and the third axis A3 will be referred to as "radial direction" with respect to each axis. A direction along the vertical direction when the vehicle drive device 100 is attached to the vehicle will be referred to as "up-down direction". When the vehicle drive device 100 is attached to the vehicle with the axial direction L parallel to a horizontal plane, one direction of the radial direction agrees with the up-down direction.

Figure 1:
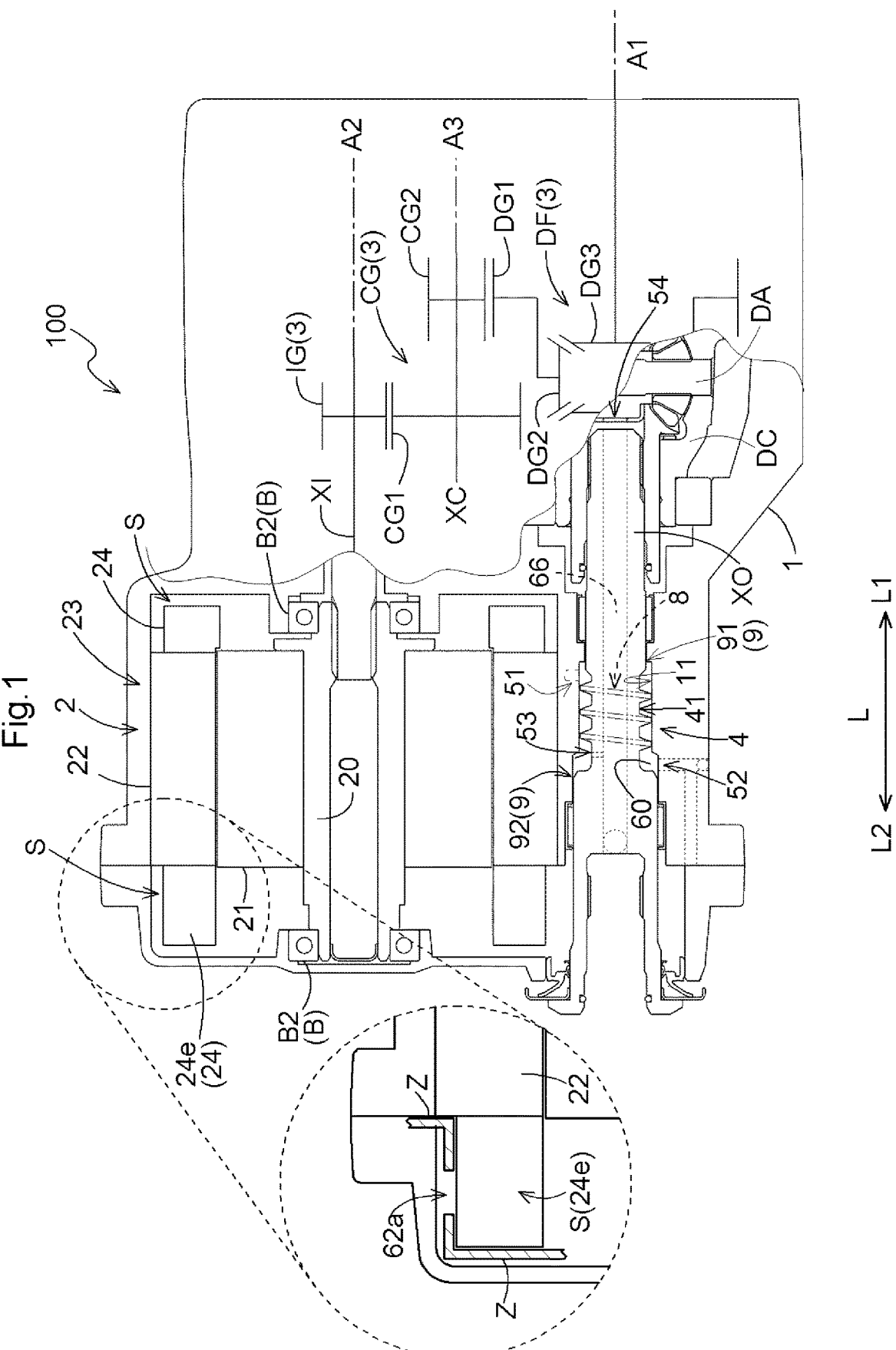
FIG. 1 is a schematic sectional view showing an example of a vehicle drive device.
Figure 2:
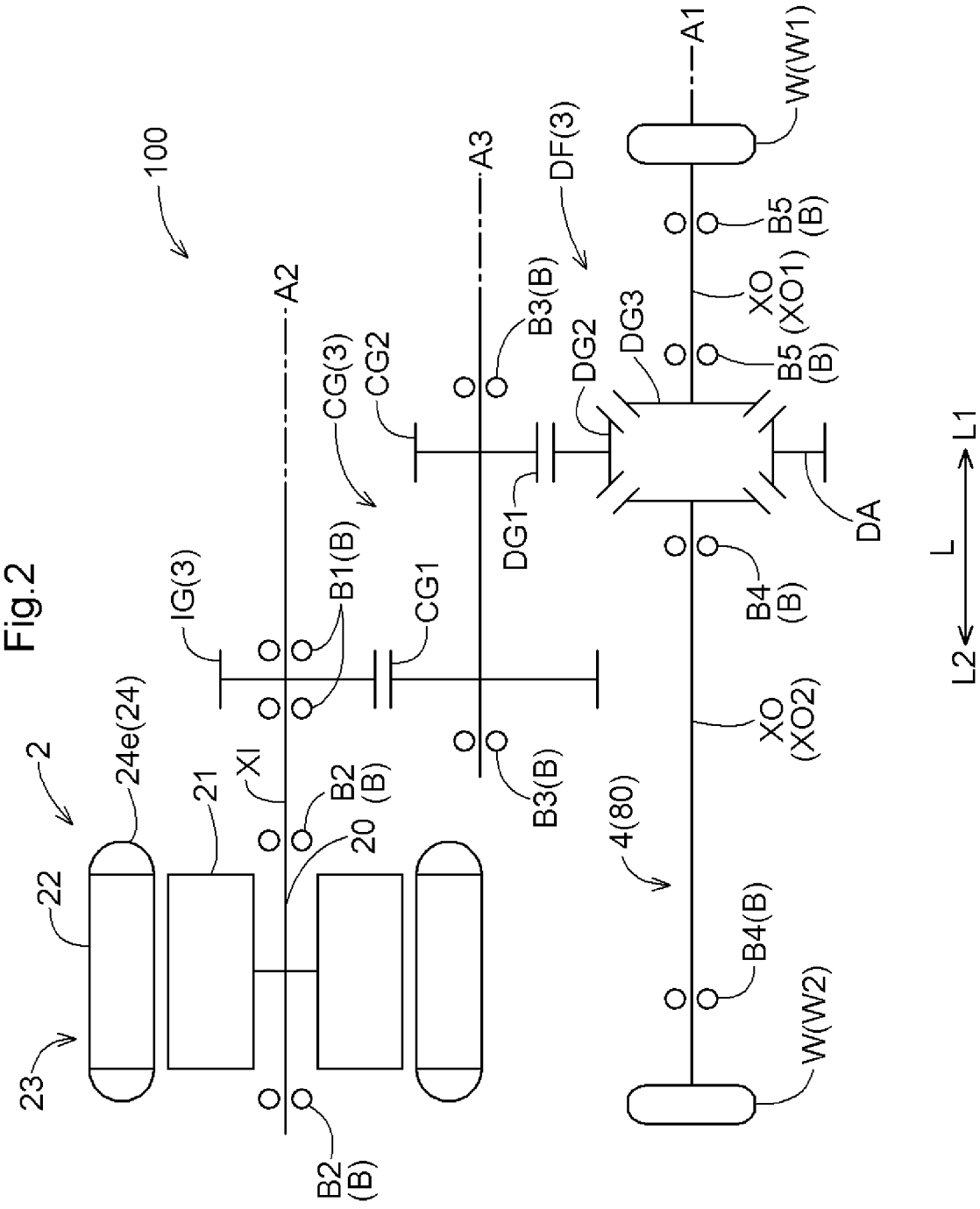
FIG. 2 is a skeleton diagram showing an example of the vehicle drive device.

As shown in FIGS. 1 and 2, the vehicle drive device 100 includes a rotary electric machine 2, a transmission mechanism 3 that transmits power between the rotary electric machine 2 and wheels W, and a case 1 that houses the rotary electric machine 2 and the transmission mechanism 3. In the present embodiment, the rotary electric machine 2 is a drive source that drives the wheels W. In the present embodiment, the transmission mechanism 3 includes a differential gear mechanism DF drivingly connected to the wheels W, a counter gear mechanism CG drivingly connecting the rotary electric machine 2 and the differential gear mechanism DF, and an input gear IG drivingly connecting the rotary electric machine 2 and the counter gear mechanism CG. The differential gear mechanism DF is disposed on the first axis A1 together with the wheels W as will be described later. The rotary electric machine 2 together with the input gear IG is disposed on the second axis A2 different from and parallel to the first axis A1. The counter gear mechanism CG is disposed on the third axis A3 parallel to the first axis A1 and the second axis A2.

The rotary electric machine 2 is, for example, a rotary electric machine (motor generator) that operates by multi-phase alternating current (e.g., three-phase alternating current), and can function as both an electric motor and a generator. The rotary electric machine 2 is supplied with electric power from a power supply (not shown) to perform power running, or supplies (regenerates) electric power generated by the inertial force of the vehicle to the power supply. In the present embodiment, the rotary electric machine 2 is connected to a direct current power supply such as a battery or a capacitor via an inverter (not shown).

The rotary electric machine 2 includes a stator 23 fixed to the case 1 or the like, and a rotor 21 rotatably supported on a radially inner side of the stator 23. In the present embodiment, the stator 23 includes a stator core 22 and stator coils 24 wound around the stator core 22, and the rotor 21 includes a rotor core and permanent magnets disposed in the rotor core. The rotor 21 of the rotary electric machine 2 is connected to a rotor shaft 20 that rotates integrally with the rotor 21. An input shaft XI is connected to the rotor shaft 20 so as to rotate integrally with the rotor shaft 20. The rotor shaft 20 is rotatably supported by the case 1 via rotor bearings B2, and the input shaft XI is rotatably supported by the case 1 via input bearings B1. The input gear IG is provided on the input shaft XI so as to rotate integrally with the input shaft XI. The input gear IG meshes with a first counter gear CG1 of the counter gear mechanism CG as will be described later. That is, the input gear IG functions as a part of the transmission mechanism to rotate integrally with the rotor 21 and transmit a driving force of the rotary electric machine 2 to the counter gear mechanism CG.

The differential gear mechanism DF is disposed on the first axis A1 and distributes the driving force transmitted from the rotary electric machine 2 side to the pair of wheels W. The differential gear mechanism DF includes a plurality of bevel gears that meshes with each other and a differential case DC that houses the plurality of bevel gears. The differential gear mechanism DF distributes and transmits the rotation and torque input to a differential input gear DG1 from the rotary electric machine 2 side to a pair of output shafts XO via pinion gears DG2 rotatably supported by a pinion shaft DA that is disposed along the radial direction and rotates integrally with the differential input gear DG1 and a pair of side gears DG3 that meshes with the pinion gears DG2. In the present embodiment, a first wheel W1 is connected to a first output shaft XO1 on the first axial side L1 of the differential gear mechanism DF, and a second wheel W2 is connected to a second output shaft XO2 on the second axial side L2 of the differential gear mechanism DF. The first output shaft XO1 is rotatably supported by the case 1 via first output bearings B5, and the second output shaft XO2 is rotatably supported by the case 1 via second output bearings B4 (see FIG. 2).

The counter gear mechanism CG is disposed on the third axis A3, and drivingly connects the rotary electric machine 2 and the differential gear mechanism DF via the input gear IG. In the present embodiment, the counter gear mechanism CG includes the first counter gear CG1 and a second counter gear CG2 connected by a counter shaft XC. That is, the counter gear mechanism CG includes the first counter gear CG1 that is disposed on the third axis A3 and meshes with the input gear IG, and the second counter gear CG2 that rotates integrally with the first counter gear CG1 and meshes with the differential input gear DG1. The counter shaft XC is rotatably supported by the case 1 via counter bearings B3.

As described above, in the present embodiment, the input gear IG, the counter gear mechanism CG, and the differential gear mechanism DF are provided as the transmission mechanism 3 in this order from the rotary electric machine 2 side in a power transmission path connecting the rotary electric machine 2 and the wheels W.

In the rotary electric machine 2 serving as the drive source for the wheels W, a current flowing through the stator coils 24 is large and a large amount of heat is likely to be generated due to the electrical resistance of the stator coils 24. As described above, the stator coils 24 are wound around the stator core 22, and coil end portions 24e are formed at the ends of the stator 23 in the axial direction L such that bent portions of the wound stator coils 24 protrude in the axial direction L from the stator core 22. The stator coils 24 are often cooled by applying a refrigerant to the coil end portions 24e. As a matter of course, the stator coils 24 are conductors and a non-conductive fluid such as oil is used as the refrigerant.

In order to supply the oil to the stator coils 24 (coil end portions 24e) inside the case 1, it is conceivable to, for example, install an oil pump inside the case 1. Such an oil pump is a mechanical oil pump such as a trochoid pump, and the vehicle drive device 100 often includes a pump input gear to which a driving force for the oil pump is input. For example, the pump input gear is often disposed so as to mesh with a pump drive gear provided so as to rotate integrally with one of the rotary members in the transmission mechanism 3.

That is, the vehicle drive device 100 includes a gear pair that is the pump drive gear and the pump input gear to drive such a mechanical oil pump. When the pump drive gear pair is provided to drive the oil pump in addition to the gears for driving the wheels W, downsizing and cost reduction of the vehicle drive device 100 may be hindered. The pump drive gear pair may be omitted with a configuration in which a pump rotor of the mechanical oil pump is connected so as to rotate integrally with any one of the rotation shafts of the transmission mechanism 3. In such a configuration, however, the mechanical oil pump is disposed, for example, coaxially with the rotation shaft of the transmission mechanism 3, such as the input shaft XI or the counter shaft XC. In that case, the dimension of the vehicle drive device 100 in the axial direction L is likely to increase by an amount corresponding to a disposition space for the oil pump. If there is a restriction on the disposition space for the vehicle drive device 100 in the axial direction L, there is a possibility that such a configuration cannot be adopted.

The vehicle drive device 100 of the present embodiment has a feature in that the pump function is provided inside the case 1 that houses the transmission mechanism 3 that transmits power between the drive source for the wheels W (rotary electric machine 2 in this case) and the wheels W while saving a space so that the pump drive gear pair described above need not be provided and an increase in the dimension of the vehicle drive device 100 in the axial direction L can be suppressed. Such a pump function (hereinafter exemplified as "pump 80") will be described below with reference to FIG. 3 showing an example of its configuration and an example of an oil distribution path.

A part of any one shaft of the transmission mechanism 3 is defined as "target shaft portion 4". In the present embodiment, as shown in FIG. 1, description will be given of an exemplary form in which the target shaft portion 4 is a part of the output shaft XO (second output shaft XO2 in this case) that is disposed coaxially with the differential gear mechanism DF and connects one wheel W (second wheel W2 in this case) and the differential gear mechanism DF. A region that is on a radially inner side of the outside diameter of the differential gear mechanism DF and overlaps the output shaft XO in terms of the disposition region in the axial direction L is likely to be a dead space. In the present embodiment, the pump function (pump 80) can be disposed by using this space. In general, such an output shaft XO is often surrounded by walls. Therefore, it is suitable for the disposition of the pump function as in the present embodiment.

Figure 3:
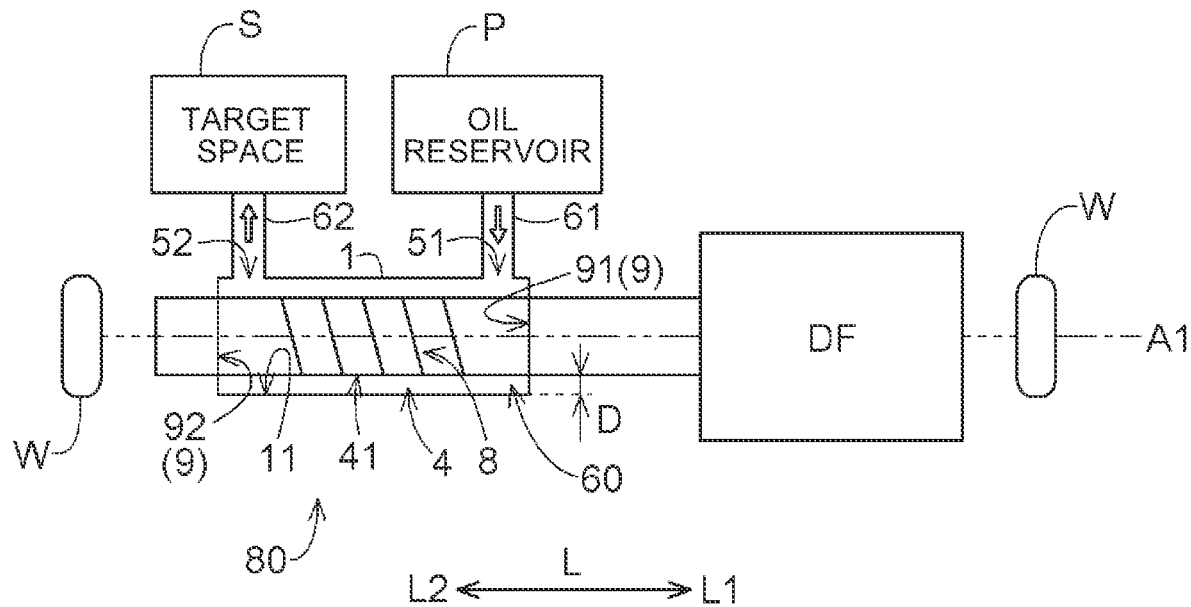
FIG. 3 is a diagram showing an example of the configuration of a pump and an example of an oil distribution path.

As shown in FIGS. 1 and 3, the case 1 has a tubular inner peripheral surface 11 that is an inner peripheral surface that faces a target outer peripheral surface 41 that is an outer peripheral surface of the target shaft portion 4. As shown in FIG. 3, the case 1 has a first opening 51 and a second opening 52 that are open in the tubular inner peripheral surface 11, a first oil passage 61 that communicates with the first opening 51, and a second oil passage 62 that communicates with the second opening 52. As shown in FIGS. 1 and 3, a blade portion 8 that rotates integrally with the target shaft portion 4 is provided between the target outer peripheral surface 41 and the tubular inner peripheral surface 11.

Regulating portions 9 that regulate the flow of oil in the axial direction L between the target outer peripheral surface 41 and the tubular inner peripheral surface 11 are provided on the first axial side L1 and the second axial side L2 with respect to the region in the axial direction L where the blade portion 8, the first opening 51, and the second opening 52 are located. In the present embodiment, a space between the pair of regulating portions 9 in the axial direction L and between the target outer peripheral surface 41 and the tubular inner peripheral surface 11 in the radial direction functions as an oil chamber 60 of the pump 80. Of the pair of regulating portions 9, the one disposed on the first axial side L1 with respect to the oil chamber 60 will be referred to as "first regulating portion 91", and the one disposed on the second axial side L2 with respect to the oil chamber 60 will be referred to as "second regulating portion 92". In the present embodiment, the regulating portions 9 are structured such that the case 1 and the shaft member including the target shaft portion 4 face or abut against each other with a small clearance in the radial direction. When the case 1 and the shaft member including the target shaft portion 4 face each other with a small clearance in the radial direction, the clearance functions as a constriction portion that regulates the flow of oil. The first opening 51 is located away from the second opening 52 on the first axial side L1. As shown in FIG. 3, the first oil passage 61 communicates with an oil reservoir P in which oil is stored. The second oil passage 62 communicates with a target space S that is a space where a supply target to which oil is supplied is disposed.

The oil reservoir P is an oil pan formed at the bottom of the case 1 or a catch tank disposed above the oil pan in the case 1. The oil pan stores oil that has descended by gravity at the bottom of the case 1. The oil accumulated in the oil pan is stirred up by any rotary member constituting the transmission mechanism 3, and lubricates bearings B such as the input bearings B1, the counter bearings B3, the first output bearings B5, and the second output bearings B4. The catch tank catches the stirred up oil and temporarily stores it before it falls into the oil pan. In the present embodiment, the catch tank is exemplified as the oil reservoir P, but the oil reservoir P may be the oil pan as a matter of course.

In the present embodiment, the oil supply target includes, for example, the coil end portions 24e of the stator coils 24 as described above. In this case, the target space S corresponds to the space where the coil end portions 24e are disposed. As shown in FIG. 1, the rotor bearings B2 are disposed at positions where they overlap the coil end portions 24e when viewed in the up-down direction, and can be lubricated by the fall of oil that has cooled the coil end portions 24e. Therefore, the rotor bearings B2 can also be the oil supply target, and the space where the rotor bearings B2 are disposed can also be the target space S. As a matter of course, the other bearings B, intermeshing gears, or the like can also be the supply target, and the space where they are disposed can be the target space S.

The temperature of the oil that has cooled the stator coils 24 increases by heat exchange with the stator coils 24, and the cooling performance decreases. Therefore, it is preferable that, for example, the oil passage from the pump 80 to the target space S be provided with an oil cooler or the like for cooling the oil.

The rotation state of each part when the wheels W are rotating in a direction in which the vehicle moves forward is defined as "forward rotation state". The blade portion 8 force-feeds oil to the second axial side L2 when the target shaft portion 4 is in the forward rotation state.

According to this configuration, the space between the target outer peripheral surface 41 of the target shaft portion 4 and the tubular inner peripheral surface 11 of the case 1 is defined as the oil chamber 60 of the pump 80, the target shaft portion 4 and the blade portion 8 are defined as the pump rotor, and the oil is supplied to the target space S by sucking the oil from the oil reservoir P with the rotation of the shaft of the transmission mechanism 3 (second output shaft XO2 in this case). That is, in the present embodiment, the pump function (pump 80) can be provided inside the case 1 without providing a separate oil pump or a gear pair for driving the oil pump. Therefore, the number of components and the size of the vehicle drive device 100 can be reduced.

As shown in FIG. 3, the oil flowing into the oil chamber 60 of the pump 80 from the first opening 51 through the first oil passage communicating with the oil reservoir P is force-fed from the first axial side L1 to the second axial side L2 in the oil chamber 60 by the helical blade portion 8 formed on the target shaft portion 4 (second output shaft XO2) that rotates in the forward rotation state. The second opening 52 is located on the second axial side L2 in the oil chamber 60, and the oil force-fed in the oil chamber 60 flows out into the second oil passage 62 from the second opening 52. The oil that has passed through the second oil passage 62 is guided to the target space S and supplied to the oil supply target (coil end portions 24e and the like to be cooled in this case).

It is sufficient that the oil pressure of the oil force-fed by such a blade portion 8 be a pressure that can guide the oil into the target space S through the second oil passage 62. For example, it is sufficient that the oil pressure be an oil pressure lower than an oil pressure for driving a hydraulic friction engagement device or the like. With such a simple configuration, the pump 80 can be structured on a small scale.

In the present embodiment, an oil supply port 62a located so as to face the coil end portion 24e of the stator coil 24 is provided inside the case 1, and the oil is supplied from the second oil passage 62 to the target space S. That is, the second opening 52 that is a discharge port of the pump 80 communicates with the oil supply port 62a via the second oil passage 62. As described above, in the rotary electric machine 2 serving as the drive source for the wheels W, the current flowing through the stator coils 24 is large and the line voltage is as high as 100 volts or more. In order to ensure insulation between the oil supply port 62a and the stator coil 24, the oil supply port 62a is made of a non-conductive member Z as shown in FIG. 1.

In the present embodiment, the blade portion 8 is formed in a helical shape along the target outer peripheral surface 41 with its central axis being the rotation axis of the target shaft portion 4 (first axis A1 in this case). Since the blade portion 8 is formed in the helical shape in this way, the oil can efficiently be force-fed from the first opening 51 to the second opening 52 in the forward rotation state of the second output shaft XO2. In the blade portion 8 of this example, a protruding portion that protrudes radially outward from the outer peripheral surface of the shaft-shaped part of the target shaft portion 4 extends in a circle along the outer peripheral surface while gradually shifting its position to one side in the axial direction L. Thus, the protruding portion constituting the blade portion 8 is formed into a helical ridge shape.

As shown in FIGS. 1 and 3, a clearance D between the outer peripheral edge of the blade portion 8 (i.e., the outermost peripheral portion of the target outer peripheral surface 41) and the tubular inner peripheral surface 11 is constant over the entire region between the first opening 51 and the second opening 52 in the axial direction L. Since the clearance D between the outer peripheral edge of the blade portion 8 and the tubular inner peripheral surface 11 is constant over the entire region functioning as the pump 80 between the first opening 51 and the second opening 52 in the axial direction L, the discharge pressure of the pump 80 can be ensured appropriately.

As shown in FIG. 1, the output shaft XO (second output shaft XO2 in this case) has an in-shaft oil passage 66 formed inside. The in-shaft oil passage 66 communicates the oil chamber 60 formed between the target outer peripheral surface 41 and the tubular inner peripheral surface 11 with the inside of the differential gear mechanism DF. Specifically, as shown in FIG. 1, the in-shaft oil passage 66 includes a third opening 53 that is open to the oil chamber 60, and a fourth opening 54 that is open to the inside of the differential gear mechanism DF, in this case, the inside of the differential case DC. Thus, the oil force-fed by the blade portion 8 can be supplied to the inside of the differential gear mechanism DF, and the differential gear mechanism DF can also be lubricated by the oil.

As described above, the pump 80 force-feeds the oil from the first opening 51 side to the second opening 52 side in the oil chamber 60 in the forward rotation state of the target shaft portion 4 (second output shaft XO2) by using the helical blade portion 8. Therefore, when the target shaft portion 4 is in a reverse rotation state, the oil is force-fed from the second opening 52 side to the first opening 51 side. That is, the oil is not supplied to the target space S. The frequency of the reverse rotation state of the target shaft portion 4, that is, the backward movement of the vehicle is considered to be lower than that of the forward movement of the vehicle. However, the oil is preferably supplied to the target space S even when the vehicle moves backward.

Figure 4:
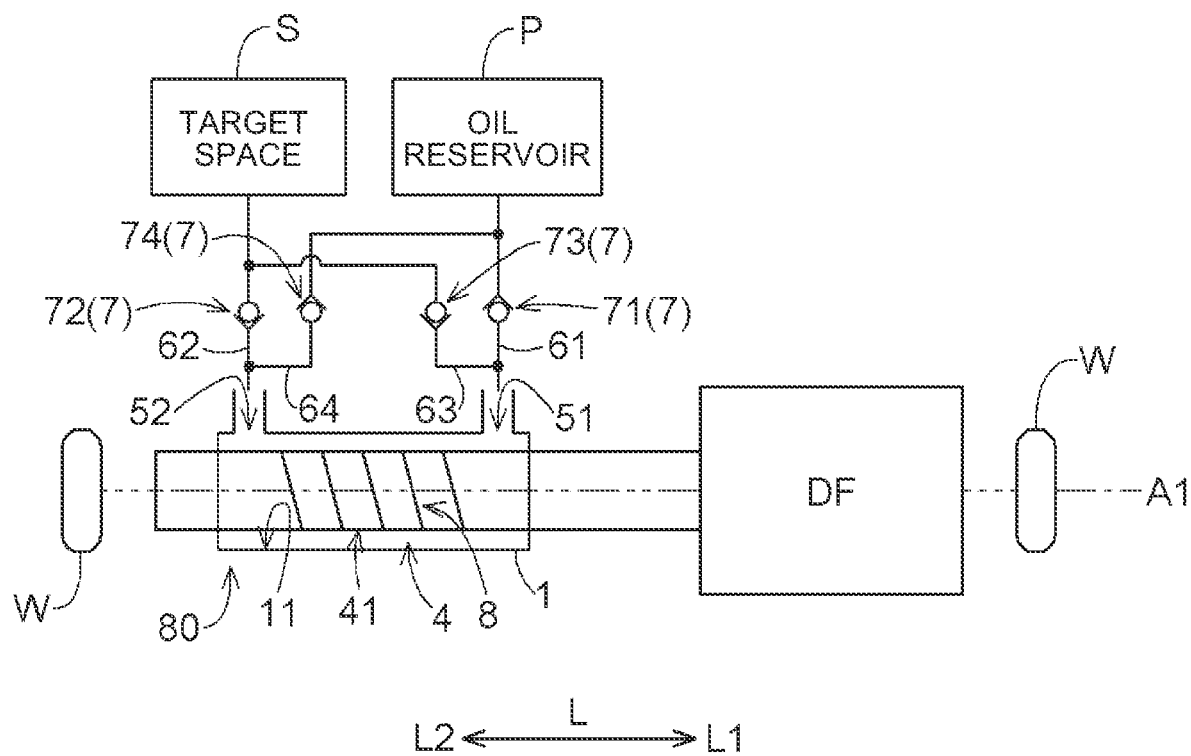
FIG. 4 is a diagram showing an example of the configuration of the pump and another example of the oil distribution path.

FIG. 4 exemplifies a configuration in which the oil can be supplied to the target space S even when the vehicle moves backward. As shown in FIG. 4, this configuration further includes a third oil passage 63 that communicates with the first opening 51 and the target space S and a fourth oil passage 64 that communicates with the second opening 52 and the oil reservoir P in addition to the first oil passage 61 and the second oil passage 62. The first oil passage 61, the second oil passage 62, the third oil passage 63, and the fourth oil passage 64 each include a one-way valve 7, and the oil flows only in one direction through each oil passage.

The first oil passage 61 includes a first one-way valve 71 that regulates the flow of the oil from the first opening 51 to the oil reservoir P and allows the flow of the oil from the oil reservoir P to the first opening 51. The second oil passage 62 includes a second one-way valve 72 that regulates the flow of the oil from the target space S to the second opening 52 and allows the flow of the oil from the second opening 52 to the target space S. The third oil passage 63 includes a third one-way valve 73 that regulates the flow of the oil from the target space S to the first opening 51 and allows the flow of the oil from the first opening 51 to the target space S. The fourth oil passage 64 includes a fourth one-way valve 74 that regulates the flow of the oil from the second opening 52 to the oil reservoir P and allows the flow of the oil from the oil reservoir P to the second opening 52. With this configuration, the oil can be supplied to the target space S by sucking the oil from the oil reservoir P with the rotation of the target shaft portion 4 regardless of whether the target shaft portion 4 is in the forward rotation state or the reverse rotation state.

When the target shaft portion 4 is in the forward rotation state, the blade portion 8 force-feeds the oil from the first opening 51 side to the second opening 52 side in the oil chamber 60. Therefore, the pressure in the first opening 51 decreases and the oil will flow from the oil reservoir P toward the first opening 51 in the first oil passage 61. Since the first one-way valve 71 allows the flow of the oil in this direction, the oil flows from the oil reservoir P to the first opening 51 through the first oil passage 61. Since the oil is force-fed from the first opening 51 side to the second opening 52 side in the oil chamber 60, the pressure in the second opening 52 increases and the oil will flow from the second opening 52 toward the target space S in the second oil passage 62. Since the second one-way valve 72 allows the flow of the oil in this direction, the oil flows from the second opening 52 to the target space S through the second oil passage 62.

Since the pressure in the first opening 51 is low, the oil will flow from the target space S toward the first opening 51 in the third oil passage 63. Since the third one-way valve 73 provided in the third oil passage 63 regulates the flow of the oil from the target space S toward the first opening 51, the oil does not flow in the third oil passage 63. Since the pressure on the second opening 52 side is high, the oil will similarly flow from the second opening 52 toward the oil reservoir P in the fourth oil passage 64. Since the fourth one-way valve 74 provided in the fourth oil passage 64 regulates the flow of the oil from the second opening 52 toward the oil reservoir P, the oil does not flow in the fourth oil passage 64. By controlling the four oil passages in this way with the one-way valves 7, the oil is supplied from the oil reservoir P to the target space S as described above with reference to FIG. 3 and the like.

When the target shaft portion 4 is in the reverse rotation state, the blade portion 8 force-feeds the oil from the second opening 52 side to the first opening 51 side in the oil chamber 60. Therefore, the pressure in the second opening 52 decreases and the oil will flow from the oil reservoir P toward the second opening 52 in the fourth oil passage 64. Since the fourth one-way valve 74 allows the flow of the oil in this direction, the oil flows from the oil reservoir P to the second opening 52 through the fourth oil passage 64. Since the oil is force-fed from the second opening 52 side to the first opening 51 side in the oil chamber 60, the pressure in the first opening 51 increases and the oil will flow from the first opening 51 toward the target space S in the third oil passage 63. Since the third one-way valve 73 allows the flow of the oil in this direction, the oil flows from the first opening 51 to the target space S through the third oil passage 63.

Since the pressure in the second opening 52 is low, the oil will flow from the target space S toward the second opening 52 in the second oil passage 62. Since the second one-way valve 72 provided in the second oil passage 62 regulates the flow of the oil from the target space S toward the second opening 52, the oil does not flow in the second oil passage 62. Since the pressure on the first opening 51 side is high, the oil will similarly flow from the first opening 51 toward the oil reservoir P in the first oil passage 61. Since the first one-way valve 71 provided in the first oil passage 61 regulates the flow of the oil from the first opening 51 toward the oil reservoir P, the oil does not flow in the first oil passage 61. By controlling the four oil passages in this way with the one-way valves 7, the oil is supplied from the oil reservoir P to the target space S even when the target shaft portion 4 is in the reverse rotation state.

Figure 5:
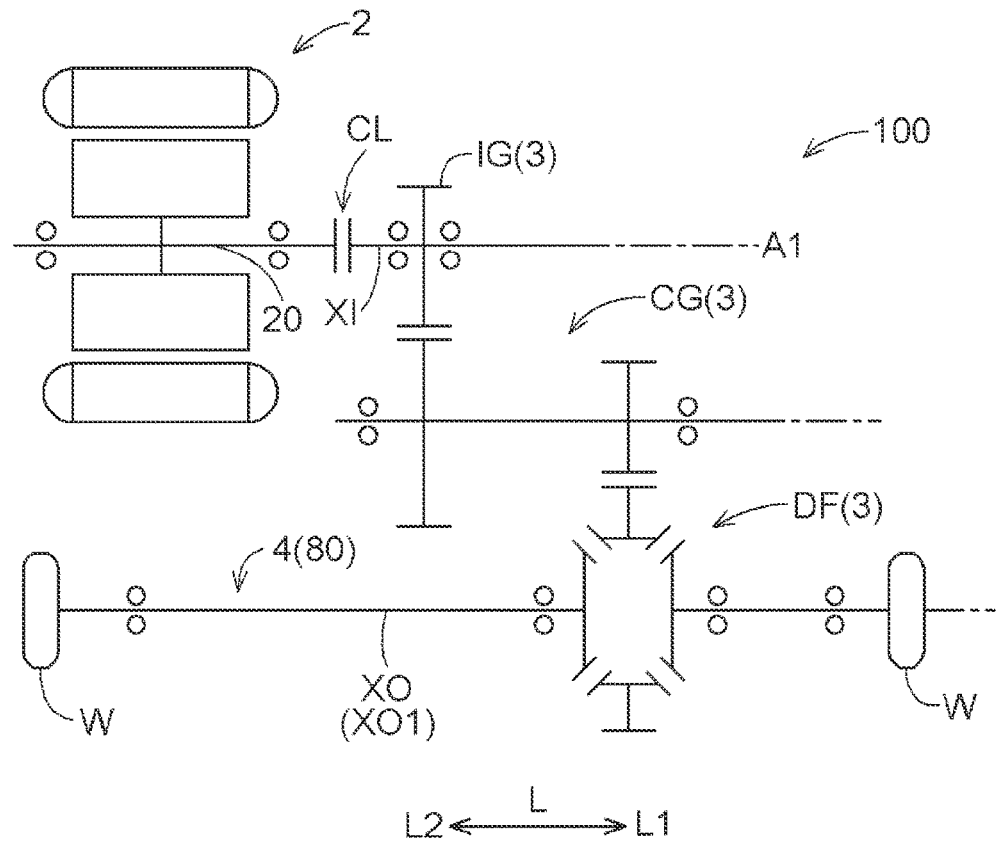
FIG. 5 is a skeleton diagram showing another example of the vehicle drive device.

When the second output shaft XO2 is the target shaft portion 4 as in the present embodiment, the oil can be supplied to the target space S as long as the vehicle is traveling (as long as the wheels W are rotating) even in a case where, for example, the rotary electric machine 2 serving as the drive source for the wheels W can be separated from the transmission mechanism 3 as shown in FIG. 5. In the form exemplified in FIG. 5, the rotor shaft 20 of the rotary electric machine 2 and the input shaft XI are drivingly connected via a clutch CL. When the clutch CL is disengaged, the driving force of the rotary electric machine 2 is not transmitted to the transmission mechanism 3, and the driving force of the rotary electric machine 2 is not even transmitted to the target shaft portion 4. Even in this state, at least a part of the shafts and gears of the transmission mechanism 3 is rotating when the wheels W are rotating. Therefore, the oil needs to be supplied to the bearings that support these shafts and the intermeshing parts of the gears to lubricate them. In the present embodiment, the target shaft portion 4 rotates in conjunction with the rotation of the wheels W even in the state in which the driving force of the rotary electric machine 2 is not transmitted to the target shaft portion 4. Therefore, the pump 80 can be driven to supply the oil to the target space S as long as the vehicle is traveling regardless of the driving state of the rotary electric machine 2. Thus, the oil can appropriately be supplied to the oil supply target including the bearings, the intermeshing parts of the gears, and the like.

In the vehicle drive device 100 of the present embodiment, the target shaft portion 4 is at least a part of the output shaft XO that is disposed coaxially with the differential gear mechanism DF and connects one wheel W and the differential gear mechanism DF. Therefore, the blade portion 8 provided so as to rotate integrally with the target shaft portion 4 can force-feed the oil even in the state in which, for example, the drive source is separated from the output shaft XO by the clutch or the like.

As described above, according to the present embodiment, the pump function (pump 80) can be provided inside the case 1 that houses the transmission mechanism 3 that transmits power between the wheels W and the drive source for the wheels W while saving a space.

Other Embodiments

Hereinafter, other embodiments will be described. The configuration of each embodiment described below is not limited to being applied alone, and can be applied in combination with the configurations of other embodiments as long as there is no contradiction.

Figure 6:
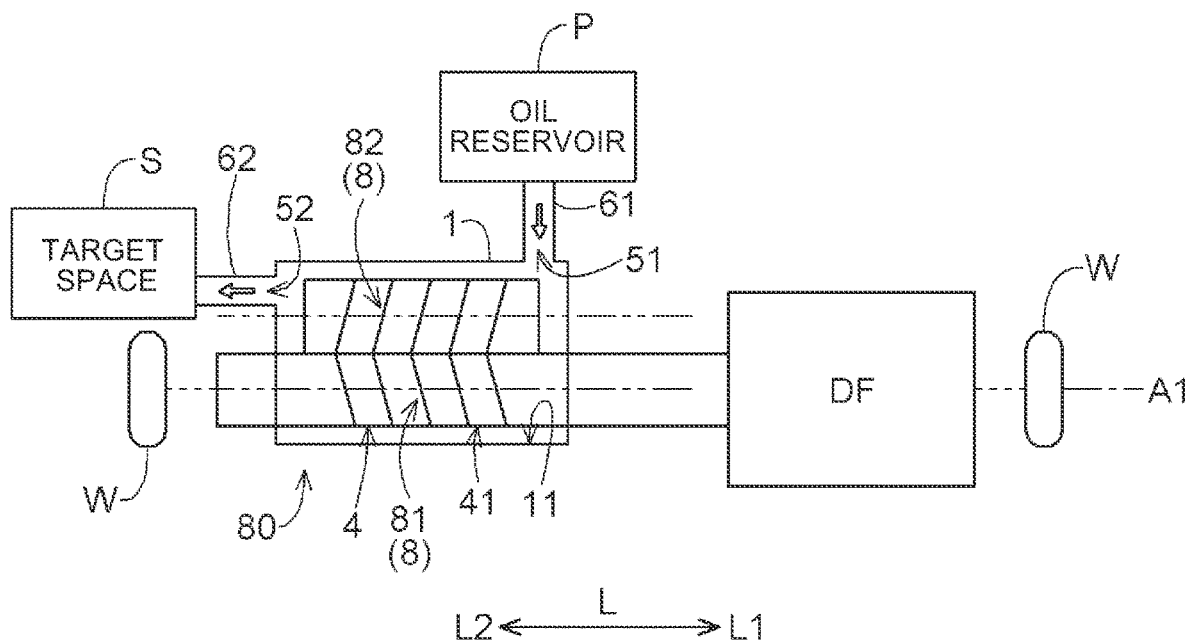
FIG. 6 is a diagram showing another example of the configuration of the pump and another example of the oil distribution path.

(1) The above description exemplifies the configuration in which the blade portion 8 includes only the helical blade along the target outer peripheral surface 41 of the target shaft portion 4. However, the configuration is not limited to this configuration. For example, as shown in FIG. 6, the configuration may include, in addition to a first blade-shaped portion 81 that is the same blade portion 8 as in the above embodiment, a second blade-shaped portion 82 disposed parallel to the first blade-shaped portion 81. In this case, it is preferable that the protruding portion constituting the second blade-shaped portion 82 be disposed so as to fit between parts of the protruding portion constituting the first blade-shaped portion 81 in the axial direction L, for example, as in a Roots pump. With such a configuration, the oil discharge pressure can be increased compared to the configuration including only the helical blade along the target outer peripheral surface 41 as in the above embodiment. Alternatively, the blade portion 8 may be formed into a shape of a screw propeller provided so as to protrude radially outward from the target outer peripheral surface 41.

(2) The above description exemplifies the form in which the regulating portions 9 are structured such that the case 1 and the shaft member including the target shaft portion 4 face or abut against each other with a small clearance in the radial direction. However, the configuration is not limited to such a configuration. Seal members that seal the oil flow path between the case 1 and the shaft member including the target shaft portion 4 may be provided and the seal members may serve as the regulating portions 9.

(3) The above description exemplifies the form in which the target shaft portion 4 is a part of the output shaft XO (second output shaft XO2 in this case) that is disposed coaxially with the differential gear mechanism DF (on the first axis A1) and connects one wheel W (second wheel W2 in this case) and the differential gear mechanism DF. However, the target shaft portion 4 may be, for example, a part of the counter shaft XC disposed on a different axis (third axis A3) from that of the differential gear mechanism DF. Alternatively, the target shaft portion 4 may be a part of the rotor shaft 20 or the input shaft XI. When the vehicle drive device 100 includes another shaft member, a part of the other shaft member may be the target shaft portion 4.

(4) The above description exemplifies the form in which the second output shaft XO2 including the target shaft portion 4 has the in-shaft oil passage 66 formed inside. However, the second output shaft XO2 including the target shaft portion 4 need not have the in-shaft oil passage 66 inside.

(5) The above description exemplifies the form in which the clearance D between the outer peripheral edge of the blade portion 8 and the tubular inner peripheral surface 11 is constant over the entire region between the first opening 51 and the second opening 52 in the axial direction L. However, the configuration is not limited to this configuration. The clearance D between the outer peripheral edge of the blade portion 8 and the tubular inner peripheral surface 11 may vary depending on the position in the axial direction L. For example, the clearance D may gradually decrease toward the second opening 52 that is the discharge port. Thus, the pressure of the oil force-fed by the blade portion 8 can be increased toward the discharge port.

(6) Referring to FIG. 4, the above description exemplifies the form in which the pump 80 functions to supply the oil to the target space S when the vehicle moves both forward and backward. Since the frequency of the backward movement of the vehicle is much lower than that of the forward movement, the oil may be supplied to the target space S only when the vehicle moves forward. That is, as shown in FIG. 3, the configuration may include only the first oil passage 61 and the second oil passage 62 without the third oil passage 63 and the fourth oil passage 64. In this case, it is also preferable that the first oil passage 61 include the first one-way valve 71 and the second oil passage 62 include the second one-way valve 72 as in the form exemplified in FIG. 4 in order to suppress backflow of the oil when the vehicle moves backward.

Summary of Embodiment

Hereinafter, a brief summary of the vehicle drive device (100) described above will be provided.

In one aspect, a vehicle drive device (100) includes a drive source (2) configured to drive a wheel (W), a transmission mechanism (3) configured to transmit power between the drive source (2) and the wheel (W), and a case that houses the drive source (2) and the transmission mechanism (3). It is assumed that a target shaft portion (4) is a part of any one shaft of the transmission mechanism (3), an axial direction (L) is a direction along a rotation axis of the target shaft portion (4), a first axial side (L1) is one side in the axial direction (L), and a second axial side (L2) is the other side in the axial direction (L). The case (1) has a tubular inner peripheral surface (11) that is an inner peripheral surface that faces a target outer peripheral surface (41) that is an outer peripheral surface of the target shaft portion (4), a first opening (51) and a second opening (52) that are open in the tubular inner peripheral surface (11), a first oil passage (61) that communicates with the first opening (51), and a second oil passage (62) that communicates with the second opening (52). A blade portion (8) configured to rotate integrally with the target shaft portion (4) is provided between the target outer peripheral surface (41) and the tubular inner peripheral surface (11). Regulating portions (9) configured to regulate a flow of oil in the axial direction (L) between the target outer peripheral surface (41) and the tubular inner peripheral surface (11) are provided on the first axial side (L1) and the second axial side (L2) with respect to a region in the axial direction (L) where the blade portion (8), the first opening (51), and the second opening (52) are located. The first opening (51) is located away from the second opening (52) on the first axial side (L1). The first oil passage (61) communicates with an oil reservoir (P) in which the oil is stored. The second oil passage (62) communicates with a target space (S) that is a space where a supply target to which the oil is supplied is disposed. It is assumed that a forward rotation state is a rotation state of each part when the wheel (W) is rotating in a direction in which a vehicle moves forward. The blade portion (8) is configured to force-feed the oil to the second axial side (L2) when the target shaft portion (4) is in the forward rotation state.

According to this configuration, the space between the target outer peripheral surface (41) of the target shaft portion (4) and the tubular inner peripheral surface (11) of the case (1) is defined as an oil chamber of a pump, and the target shaft portion (4) and the blade portion (8) are defined as a pump rotor. Therefore, the oil can be supplied to the target space (S) by sucking the oil from the oil reservoir (P) with the rotation of the shaft of the transmission mechanism (3). That is, the pump function can be provided inside the case (1) without providing a separate oil pump or a gear pair for driving the oil pump. Therefore, the number of components and the size of the vehicle drive device (100) can be reduced. In other words, according to this configuration, the pump function can be provided inside the case (1) that houses the transmission mechanism (3) that transmits power between the wheel (W) and the drive source (2) for the wheel (W) while saving a space.

It is preferable that the vehicle drive device (100) include a differential gear mechanism (DF) configured to distribute rotation transmitted via the transmission mechanism (3) to a pair of the wheels (W), and the target shaft portion (4) be at least a part of an output shaft (XO) that is disposed coaxially with the differential gear mechanism (DF) and connects one of the wheels (W) and the differential gear mechanism (DF).

For example, a region that is on a radially inner side of the outside diameter of the differential gear mechanism (DF) and overlaps the output shaft (XO) in terms of the disposition region in the axial direction (L) is likely to be a dead space. According to this configuration, the pump function can be disposed by using this space. In general, such an output shaft (XO) is often surrounded by walls. Therefore, it is suitable for the disposition of the pump function as in this configuration. The blade portion (8) provided so as to rotate integrally with the target shaft portion (4) can force-feed the oil as long as the wheel (W) drivingly connected to the output shaft (XO) is rotating even in a state in which, for example, the drive source (2) is separated from the output shaft (XO) by a clutch or the like.

In the vehicle drive device (100), it is preferable that the output shaft (XO) have an in-shaft oil passage (66) formed inside, and the in-shaft oil passage (66) communicate an oil chamber (60) formed between the target outer peripheral surface (41) and the tubular inner peripheral surface (11) with an inside of the differential gear mechanism (DF).

Since the in-shaft oil passage (66) communicates the oil chamber (60) with the inside of the differential gear mechanism (DF), the oil force-fed by the blade portion (8) can be supplied to the inside of the differential gear mechanism (DF), and the differential gear mechanism (DF) can also be lubricated by the oil.

In the vehicle drive device (100), it is preferable that the blade portion (8) be formed in a helical shape along the target outer peripheral surface (41) with a central axis being the rotation axis of the target shaft portion (4), and a clearance (D) between an outer peripheral edge of the blade portion (8) and the tubular inner peripheral surface (11) be constant over an entire region between the first opening (51) and the second opening (52) in the axial direction (L).

According to this configuration, the blade portion (8) is formed in the helical shape. Therefore, the oil can efficiently be force-fed from the first opening (51) to the second opening (52) in the forward rotation state of the target shaft portion (4). Since the clearance (D) between the outer peripheral edge of the blade portion (8) and the tubular inner peripheral surface (11) is constant over the entire region functioning as a pump (80) between the first opening (51) and the second opening (52) in the axial direction (L), the discharge pressure of the pump (80) can be ensured appropriately.

It is preferable that the vehicle drive device (100) further have a third oil passage (63) that communicates with the first opening (51) and the target space (S), and a fourth oil passage (64) that communicates with the second opening (52) and the oil reservoir (P), the first oil passage (61) include a first one-way valve (71) configured to regulate a flow of the oil from the first opening (51) to the oil reservoir (P) and allow a flow of the oil from the oil reservoir (P) to the first opening (51), the second oil passage (62) include a second one-way valve (72) configured to regulate a flow of the oil from the target space (S) to the second opening (52) and allow a flow of the oil from the second opening (52) to the target space (S), the third oil passage (63) include a third one-way valve (73) configured to regulate a flow of the oil from the target space (S) to the first opening (51) and allow a flow of the oil from the first opening (51) to the target space (S), and the fourth oil passage (64) include a fourth one-way valve (74) configured to regulate a flow of the oil from the second opening (52) to the oil reservoir (P) and allow a flow of the oil from the oil reservoir (P) to the second opening (52).

According to this configuration, the four oil passages are controlled by the one-way valves (7). Therefore, the oil can be supplied to the target space (S) by sucking the oil from the oil reservoir (P) with the rotation of the target shaft portion (4) regardless of whether the target shaft portion (4) is in the forward rotation state or the reverse rotation state.

DESCRIPTION OF THE REFERENCE NUMERALS

1: case, 2: rotary electric machine (drive source), 3: transmission mechanism, 4: target shaft portion, 7: one-way valve, 8: blade portion, 9: regulating portion, 11: tubular inner peripheral surface, 41: target outer peripheral surface, 51: first opening, 52: second opening, 60: oil chamber, 61: first oil passage, 62: second oil passage, 63: third oil passage, 64: fourth oil passage, 66: in-shaft oil passage, 71: first one-way valve, 72: second one-way valve, 73: third one-way valve, 74: fourth one-way valve, 100: vehicle drive device, D: clearance, DF: differential gear mechanism, L: axial direction, L1: first axial side, L2: second axial side, P: oil reservoir, S: target space, W: wheel, XO: output shaft, XO2: second output shaft (output shaft)

The invention claimed is:

1. A vehicle drive device comprising:
a drive source configured to drive a wheel; a transmission mechanism configured to transmit power between the drive source and the wheel; and a case that houses the drive source and the transmission mechanism, wherein
a target shaft portion that is a part of any one shaft of the transmission mechanism, an axial direction is a direction along a rotation axis of the target shaft portion, a first axial side is one side in the axial direction, and a second axial side is the other side in the axial direction,
the case has a tubular inner peripheral surface that is an inner peripheral surface that faces a target outer peripheral surface that is an outer peripheral surface of the target shaft portion, a first opening and a second opening that are open in the tubular inner peripheral surface, a first oil passage that communicates with the first opening, and a second oil passage that communicates with the second opening,
a blade portion configured to rotate integrally with the target shaft portion is provided between the target outer peripheral surface and the tubular inner peripheral surface,
regulating portions configured to regulate a flow of oil in the axial direction between the target outer peripheral surface and the tubular inner peripheral surface are provided on the first axial side and the second axial side with respect to a region in the axial direction where the blade portion, the first opening, and the second opening are located,
the first opening is located away from the second opening on the first axial side,
the first oil passage communicates with an oil reservoir in which the oil is stored,
the second oil passage communicates with a target space that is a space where a supply target to which the oil is supplied is disposed, and
a differential gear mechanism configured to distribute rotation transmitted via the transmission mechanism to a pair of the wheels, wherein
the blade portion is configured to force-feed the oil to the second axial side when the target shaft portion is in a forward rotation state that is a rotation state of each part when the wheel is rotating in a direction in which a vehicle moves forward, and
the target shaft portion is at least a part of an output shaft that is disposed coaxially with the differential gear mechanism and connects one of the wheels and the differential gear mechanism.

2. The vehicle drive device according to claim 1, wherein:
the output shaft has an in-shaft oil passage formed inside; and
the in-shaft oil passage communicates an oil chamber formed between the target outer peripheral surface and the tubular inner peripheral surface with an inside of the differential gear mechanism.

3. The vehicle drive device according to claim 1, wherein:
the blade portion is formed in a helical shape along the target outer peripheral surface with a central axis being the rotation axis of the target shaft portion; and a clearance between an outer peripheral edge of the blade portion and the tubular inner peripheral surface is constant over an entire region between the first opening and the second opening in the axial direction.

4. A vehicle drive device comprising:

a drive source configured to drive a wheel; a transmission mechanism configured to transmit power between the drive source and the wheel; and a case that houses the drive source and the transmission mechanism, wherein a target shaft portion that is a part of any one shaft of the transmission mechanism, an axial direction is a direction along a rotation axis of the target shaft portion, a first axial side is one side in the axial direction, and a second axial side is the other side in the axial direction, the case has a tubular inner peripheral surface that is an inner peripheral surface that faces a target outer peripheral surface that is an outer peripheral surface of the target shaft portion, a first opening and a second opening that are open in the tubular inner peripheral surface, a first oil passage that communicates with the first opening, and a second oil passage that communicates with the second opening, a blade portion configured to rotate integrally with the target shaft portion is provided between the target outer peripheral surface and the tubular inner peripheral surface, regulating portions configured to regulate a flow of oil in the axial direction between the target outer peripheral surface and the tubular inner peripheral surface are provided on the first axial side and the second axial side with respect to a region in the axial direction where the blade portion, the first opening, and the second opening are located, the first opening is located away from the second opening on the first axial side, the first oil passage communicates with an oil reservoir in which the oil is stored, and the second oil passage communicates with a target space that is a space where a supply target to which the oil is supplied is disposed, a third oil passage that communicates with the first opening and the target space; and a fourth oil passage that communicates with the second opening and the oil reservoir, wherein the blade portion is configured to force-feed the oil to the second axial side when the target shaft portion is in a forward rotation state that is a rotation state of each part when the wheel is rotating in a direction in which a vehicle moves forward, the first oil passage includes a first one-way valve configured to regulate a flow of the oil from the first opening to the oil reservoir and allow a flow of the oil from the oil reservoir to the first opening, the second oil passage includes a second one-way valve configured to regulate a flow of the oil from the target space to the second opening and allow a flow of the oil from the second opening to the target space, the third oil passage includes a third one-way valve configured to regulate a flow of the oil from the target space to the first opening and allow a flow of the oil from the first opening to the target space, and the fourth oil passage includes a fourth one-way valve configured to regulate a flow of the oil from the second opening to the oil reservoir and allow a flow of the oil from the oil reservoir to the second opening.

* * * * *